(12) United States Patent
Gray

(10) Patent No.: US 9,776,462 B1
(45) Date of Patent: Oct. 3, 2017

(54) SYSTEM AND METHOD FOR TIRE MEASUREMENT

(71) Applicant: GM GLOBAL TECHNOLOGY OPERATIONS LLC, Detroit, MI (US)

(72) Inventor: Jeremy P. Gray, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/250,280

(22) Filed: Aug. 29, 2016

(51) Int. Cl.
*B60C 23/04* (2006.01)
*G01L 17/00* (2006.01)

(52) U.S. Cl.
CPC ...... *B60C 23/0447* (2013.01); *B60C 23/0498* (2013.01); *G01L 17/00* (2013.01)

(58) Field of Classification Search
CPC .... G60C 23/00; G60C 23/20; G60C 23/0447; G60C 23/0498; G60C 23/065; G01L 17/00; G07C 5/008; G06F 8/65; B60C 23/00; B60C 23/02; B60C 23/04; B60C 23/20; B60C 23/0447; B60C 23/0498; B60C 23/065
USPC .... 340/442, 444, 447, 449; 73/146.1, 146.2, 73/146.5, 146.8; 701/1, 29
See application file for complete search history.

(56) References Cited

U.S. PATENT DOCUMENTS

| | | | |
|---|---|---|---|
| 5,838,229 A * | 11/1998 | Robinson, III | B60C 23/0401 340/442 |
| 9,575,160 B1 * | 2/2017 | Davis | G01S 7/023 |
| 2003/0030553 A1 * | 2/2003 | Schofield | B60C 23/061 340/442 |
| 2006/0025897 A1 * | 2/2006 | Shostak | B60C 23/005 701/1 |
| 2008/0018445 A1 * | 1/2008 | Shimura | B60C 23/0408 340/442 |
| 2008/0140278 A1 * | 6/2008 | Breed | G07C 5/008 701/31.4 |
| 2009/0259392 A1 * | 10/2009 | Berard | G05D 1/0202 701/121 |
| 2014/0253311 A1 * | 9/2014 | Yu | B60C 23/00 340/447 |

* cited by examiner

*Primary Examiner* — Hung T Nguyen

(57) ABSTRACT

A system to perceive the structure of a tire chamber is presented herein. The system includes: a memory, controller, wheel, vehicle tire, and sensor. The memory includes executable instructions. The controller is in turn configured to read and execute the executable instructions. The wheel is adapted to connect to a vehicle axle. The tire is connected to the wheel. The sensor is located within the interior chamber of the tire. The sensor is moreover configured to measure a selected portion of the tire chamber. The sensor is further configured to communicate the measurement to the controller. The executable instructions enable the controller to: operate the sensor so as to make measurements of the tire chamber; retrieve (from the sensor) measurement information of the tire chamber; and generate tire-chamber-perception information from the measurement information of the tire chamber.

13 Claims, 4 Drawing Sheets

SYSTEM AND METHOD FOR TIRE MEASUREMENT

INTRODUCTION

Maintaining vehicle tire inflation pressure helps to optimize vehicle performance as well as fuel economy. Properly inflated tires allow the vehicle operator to experience drive comfort and optimal vehicle performance. Proper inflation also stabilizes tire structure and blends responsiveness. As such, tire deflection integrity can remain intact, the tire can avoid excessive sidewall flexing, heat buildup can be managed, and an appropriate rolling resistance can be maintained. It is therefore desirable to take accurate measurements from within the tire which provide an up-to-date understanding of tire structure and tire responsiveness. It is moreover desirable for these measurements to help provide key estimations regarding the tire structure.

SUMMARY

A system to perceive the structure of a tire chamber is presented herein. The system includes: a memory, controller, wheel, vehicle tire, and sensor. The memory includes one or more executable instructions. The controller is in turn configured to read and execute the executable instructions. The wheel is adapted to connect to a vehicle axle. The tire is connected to the wheel. The sensor is fastened to the wheel and located within the interior chamber of the tire. The sensor is moreover configured to make one or more measurements of a selected portion of the tire chamber. The sensor is further configured to communicate the measurements to the controller. The executable instructions enable the controller to: operate the sensor so as to make one or more measurements of the selected portion of the tire chamber; retrieve (from the sensor) measurement information of the tire chamber; and generate tire-chamber-perception information from the measurement information of the tire chamber.

The system may further include a display that is configured to exhibit information. In this instance, the executable instructions may further enable the controller to: exhibit (via the display) the tire-chamber-perception information. The executable instructions further yet enable the controller to: generate an aqua-planning warning from the measurement information of the tire chamber; and exhibit (through the display) the aqua-planning warning.

The sensor may be an Ultra Short-Range Radar (USRR). The sensor may be in a wireless communication with the controller. The sensor may be configured to cover longitudinal measurements of the tire chamber.

The executable instructions may enable the controller to calculate one or more lateral-profile estimations from the measurement information of the tire chamber. The executable instructions may further enable the controller to: calculate one or more tire-volume estimations and/or calculate one or more tire-vibration estimations and/or calculate one or more wheel-normal-reaction estimations and/or measure one or more lateral-deflection estimations, from the lateral-profile estimations; calculate one or more tire-volume-derivative estimations and/or calculate one or more lateral-deflection-derivative estimations, from the lateral-profile estimations; and generate the tire-chamber-perception information, from one or more of these tire chamber estimations. In such an instance, the controller may incorporate a plurality of cores configured to: simultaneously compile the tire chamber estimations; and calculate, in a parallel manner, the tire-chamber-perception information from the tire chamber estimations.

A method to perceive the structure of a tire chamber is also presented herein. The method includes the steps of: providing a memory comprising one or more executable instructions; providing a controller configured to read and execute the one or more executable instructions; providing a wheel adapted to connect to a vehicle axle; providing a vehicle tire connected to the wheel; providing a sensor fastened to the wheel and located within the interior chamber of the vehicle tire; configuring the sensor to make one or more measurements of a selected portion of the tire chamber; configuring the sensor to communicate the measurements to the controller; wherein the executable instructions enable the controller to conduct the steps of: operating (via the controller) the sensor; measuring (via the sensor) the selected portion of the tire chamber; retrieving from the sensor (via the controller) measurement information of the tire chamber; and calculating (via the controller) tire-chamber-perception information from the measurement information of the tire chamber.

Further features and advantages will appear more clearly on a reading of the following detailed description of the system and method disclosed herein, which is given by way of non-limiting example only and with reference to the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
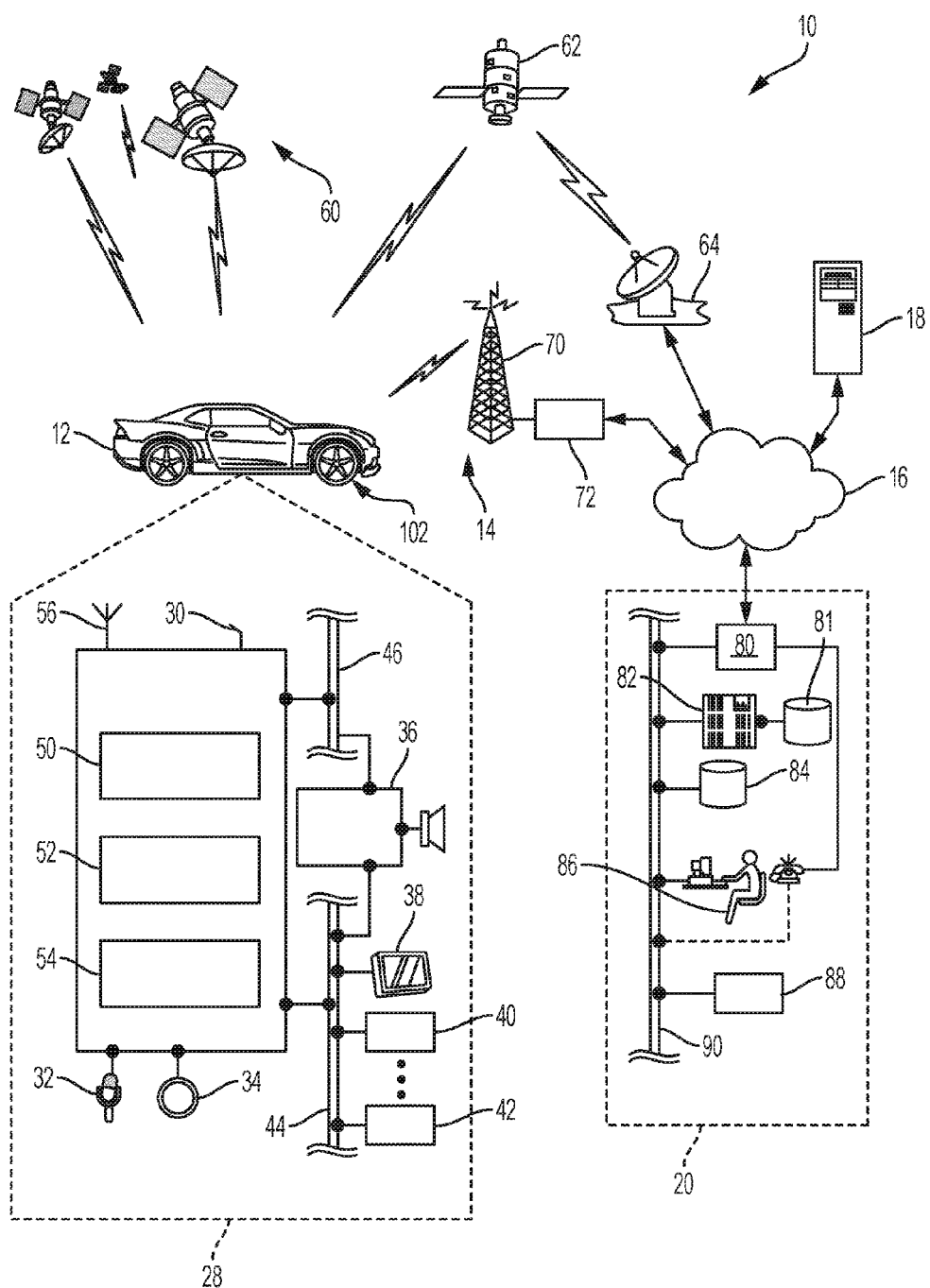
FIG. 1 is a block diagram depicting an embodiment of a communications system that is capable of utilizing the system and method disclosed herein.

With reference to FIG. 1, there is shown an operating environment that includes, among other features, a mobile vehicle communications system 10 and that may be used to implement the method disclosed herein. Communications system 10 generally includes a vehicle 12 having four tires 102, one or more wireless carrier systems 14, a land communications network 16, a computer 18, and a data center 20. It should be understood that the disclosed method may be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., may also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40, as well as a number of vehicle system modules (VSMs) 42. Some of these devices may be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data transmissions over wireless carrier system 14 and via wireless networking. This enables the vehicle to communicate with data center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to either Global System for Mobile Communications (GSM) or Code Division Multiple Access (CDMA) standards and thus includes a cellular chipset 50 for voice communications like hands-free calling, a wireless modem for data transmission, an electronic telematics controller device 52, one or more digital memory devices 54, and an antenna 56. It should be appreciated that the modem can either be implemented through software stored in the telematics unit 30 and is executed by controller 52, or it can be a separate hardware component located internal or external to telematics unit 30. The modem can operate using any number of different standards or protocols such as, but not limited to, GSM, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Telematics controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method and system functionality discussed herein.

Memory 54 can also store account information such as, but not limited to, vehicle dynamics information. The vehicle dynamics information, for example, may be general data pertaining to vehicle tires characteristics such as, volumetric-measurement data, tire-vibration data, tire-pressure data, and lateral-force data. The vehicle dynamics information can further be general data pertaining to vehicle stability and performance characteristics and various other vehicle dynamic models (i.e., mathematical models of the tire, suspension, steering, driveline, or the like of). This data can moreover be implemented to perceive the structure of the interior chamber of one or more tires 102. The perception of tire chamber structure can further help to understand information such as, but not limited, the tire profile shape at rest, tire profile shape during high velocity tire rotation (i.e., to understand tire-tread wear and forces acting on the tire in the longitudinal and lateral directions), enable agile inverse tire dynamic calculations, calculate tire patch area, calculate effective tire rolling radius, calculate tire rolling resistance, generate inverse terrain profiling information, estimate tire load (normal reaction), and generate an accurate linear and angular tire velocity. It should be appreciated such data may include, but is not limited to, equations to facilitate the calculation of such estimation/perception data. It should be further appreciated that this data may be stored in the form of one or more tables within memory 54. It should be further appreciated that these tables could include experimental data results for referencing and comparing current and past calculations (i.e., experimental data to aid the system in understanding or predicting what environmental or physical events may be occurring or about to occur).

Antenna 56 can be a dual antenna and include transmitter and receiver hardware components which allow for upload and download of data transmissions at various bandwidths and communication ranges. For instance, antenna 56 can transmit and receive Machine-Type Communications (MTC) including executable instructions, wherein telematics unit 30 automatically communicates with a remotely located machine such as, but not limited to, computer 18 or a server located at data center 20 (discussed below).

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more vehicle locations and use the sensed input to perform diagnostic, monitoring, control, reporting and/or other functions. Each of the VSMs 42 is preferably connected by communications bus 44, to the other VSMs, as well as to the telematics unit 30, and can be programmed to run vehicle system and subsystem diagnostic tests. As an example, one VSM 42 can be a radar transducer that measures various aspects of the lateral profile contours of the inner chamber of one or more vehicle tires. According to one embodiment, the transducer is equipped with monitoring features that provide myriad real-time data from within one or more vehicle tires 102 such as, but not limited to, tire volume calculations as well as lateral-profile estimations to allow a vehicle operator and/or data center technician 86 to identify malfunctions within one or more of the vehicle tires 102 and/or better handle vehicle 12. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation) such as the exhibition of vehicle dynamics information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/GPRS (e.g., 3G, 4G LTE, 4.5G, and/or 5G). As will be appreciated by those skilled in the art, various cell tower 70/base station/MSC arrangements are possible and could be used with wireless system 14. For instance, the base station and cell tower 70 could be co-located at the same site or they could be remotely located from one another (as exemplified in FIG. 2), each base station could be responsible for a single cell tower or a single base station could service various cell towers 70, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. Server 82 can incorporate a data controller 81 which essentially controls the overall operation and function of server 82. Controller 81 may control, send, and/or receive data information (e.g., data transmissions) from one or more of the databases 84 and mobile computing device 57. Controller 81 is capable of reading executable instructions stored in a non-transitory machine-readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (not shown) connected between the switch 80 and network 90.

Database 84 can store account information such as, but not limited to, vehicle dynamics information. The vehicle dynamics information, for example, may be general data pertaining to vehicle tires such as, volumetric-measurement data, tire-vibration data, tire-pressure data, and lateral-force data. The vehicle dynamics information can further be general data pertaining to vehicle stability and performance characteristics and various other vehicle dynamic models (i.e., mathematical models of the tire, suspension, steering, driveline, or the like of). This data can moreover be implemented to perceive the structure of the interior chamber of one or more tires 102. The perception of tire chamber structure can further help to understand information such as, but not limited, the tire profile shape at rest, tire profile shape during high velocity tire rotation (i.e., to understand tire-tread wear and forces acting on the tire in the longitudinal and lateral directions), enable agile inverse tire dynamic calculations, calculate tire patch area, calculate effective tire rolling radius, calculate tire rolling resistance, generate inverse terrain profiling information, estimate tire load (normal reaction), and generate an accurate linear and angular tire velocity. It should be appreciated such data may include, but is not limited to, equations to facilitate the calculation of such estimation/perception data. It should be further appreciated that this data may be stored in the form of one or more tables within database 84. It should be further appreciated that these tables could include experimental data results for referencing and comparing current and past calculations (i.e., experimental data to aid the system in understanding or predicting what environmental or physical events may be occurring or about to occur).

Data transmissions are passed via the modem to server 82 and/or database 84. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Figure 2:
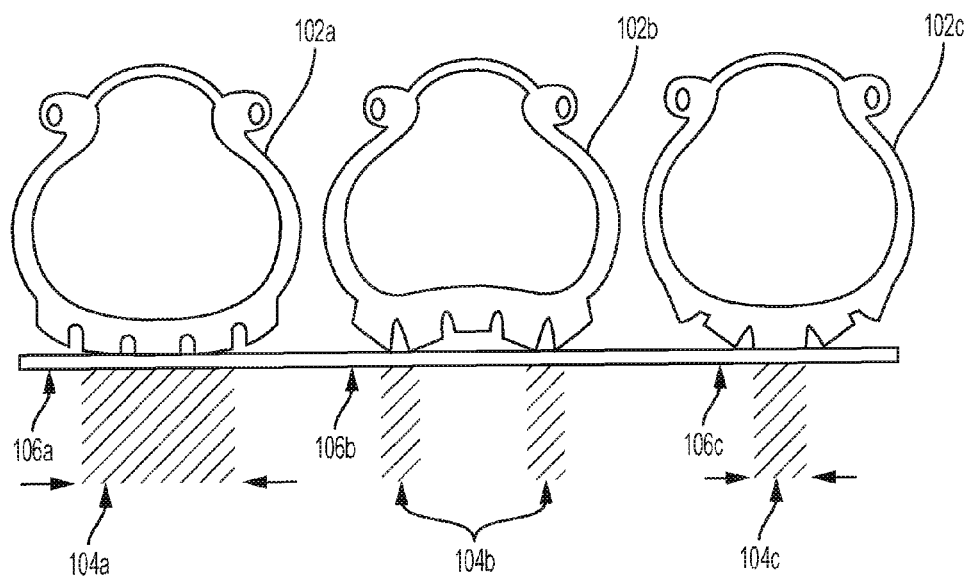
FIG. 2 are various examples of tire inflation status.

FIG. 2 shows three exemplary inflations of vehicle tire 102 (shown as 102a, 102b, 102c). As shown, tire 102a represents a tire that is properly inflated (i.e., in accordance with tire manufacture ratings). The contact portion 104a, where the tire thread meets the corresponding road location 104a, is thus substantially spread in an even manner under tire tread 102a. As a result, tire 102a can provide maximum tire life, optimum traction, and good vehicle handling.

Tire 102*b*, however, represents a tire that is under inflated. Contact portion 104*b* is thus uneven and only makes contact with road location 106*b* at the edges of tire 102*b*. Contact of this kind, increases the tires rolling resistance, negatively affects the vehicle's fuel economy, and can lead to increased, uneven tread wear. Under inflation can also be dangerous because it may cause a tire to run hot, through increased sidewall flexing, and increases the risk of failure and blowout. Moreover, in certain instances, low tire pressure can affect the weight distribution between the vehicle's wheels, which could affect tire life, vehicle traction (i.e., hard cornering, lateral and longitudinal slip, etc.), chassis loading, steering (i.e., creating pull), braking, and alignment.

Tire 102*c*, on the other hand, represents a tire that is over inflated. Contact portion 104*c* is thus uneven and only makes contract with road location 106*c* at the center portions of tire 102*c*. Contact of this kind, greatly decreases rolling resistance and can lead to increased, uneven tread wear in the middle of tire 102*c*. Reduced size of the contact patch also reduces the tire grip, which can lead to accidents and dangerous, unpredictable vehicle handling.

Inflation issues are not just created when the tire 102 is being pressurized, over inflation and under inflation problems can also be created during vehicle operation. During operation, for example, the constant flexing and vibrating of the tire 102 generates heat in the tire structure, particularly its sidewalls, which may in turn cause internal air pressure to rise such that the tire may become over inflated while in operation. In another example, drastic temperature drops in the environment may cause air within the tire to cool and air pressure to drop, respectively, such that the tire may under inflate while in operation. Inflation can also relate to the damping properties of the tire, thus affecting the wheel's vibration, suspension, and vehicle handling and performance. It would therefore be beneficial to monitor tire pressure during vehicle operation.

Figures 3, 4:
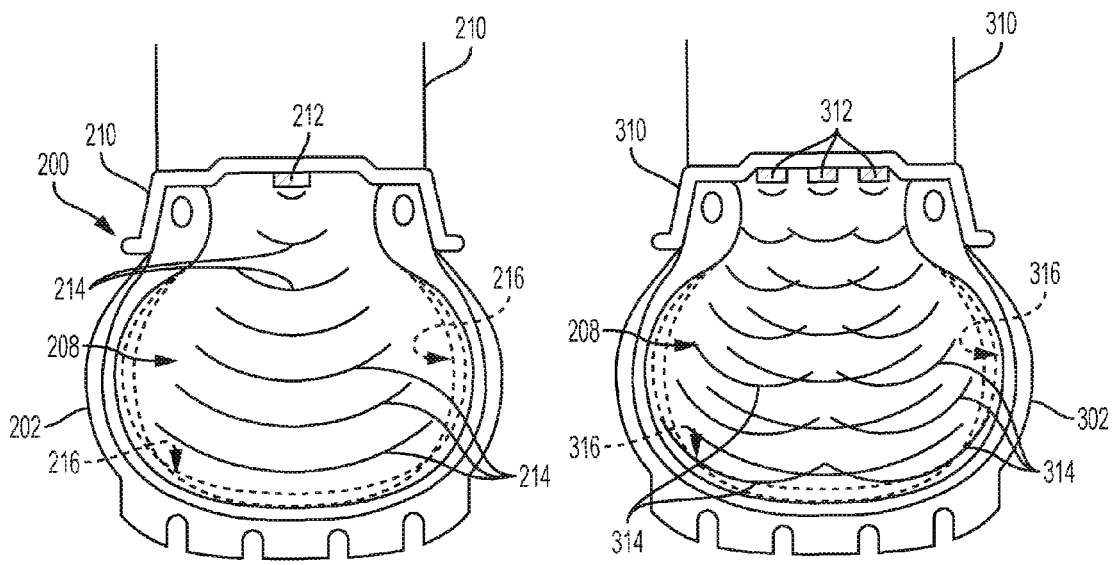
FIG. 3 is side view of an exemplary system to perceive the structure of a tire chamber.
FIG. 4 is side view of another exemplary system to perceive the structure of a tire chamber.

As shown in FIG. 3, system 200 can be implemented to perceive the structure of a tire's interior chamber 208 and thus provide the components for exemplary monitoring of vehicle tire pressure throughout vehicle operation. System 200 includes a vehicle wheel 210 that connects to the vehicle's axle (not shown) and thus vehicle 12. Tire 202 is connected to wheel 210 to create the sealed, interior chamber 208 in a fashion generally known in the art. A radar transducer 212 (sensor) is fastened around the rim circumference of wheel 210 so as to be centrally located within the interior chamber 208. Transducer 212 may be embodied as a short-ranged radar module or an ultra-short-ranged radar module (USSR) (e.g., a single-chip nano-radar sensor) that can implement one or more radar technologies such as, but not limited to, Pulse Doppler, FM-CW (frequency-modulated continuous-wave), or UWB-IR (ultra-wide-band impulse radio). Transducer 212 moreover may include a short range wireless communications component (e.g., a Bluetooth low energy transceiver) and allows it to wirelessly be controlled by and transmit measurement data directly to telematics unit 30, particularly, controller device 52, or indirectly to telematics unit 30, particularly, through a remote VSM data communication collection node (not shown). It should be understood that transducer 212 could also be embodied as an LED (light-emitting diode) or laser sensor to make proper measurements.

Power may be provided to transducer 212 through internal wiring connected to a power source such as, but not limited to, the telematics unit 30 or the vehicle battery. As such, wiring may go through wheel 210 to reach its respective power source. Transducer 212 may also have a power source which is a battery. Ambient energy sources may also provide power to transducer 212 through energy harvesting devices configured to store the mechanical energy of transducer movement (i.e., energy scavenging). Such an energy harvesting device may, for example, implement piezoelectric device that would convert the radial movement of transducer 212 (i.e., while wheel 210 spins to move vehicle 12) into electrical energy that is used to subsequently charge and be stored within a capacitor or lithium-ion battery.

As shown, transducer 212 pulses radio waves 214 throughout interior chamber 208 to conduct characteristic measurements of the internal structure of tire 202. For instance, transducer 212 may measure the cross-section of interior chamber 208 and such measurements may be made with micro-meter accuracy. Transducer 212 may also measure the camber angle of selected portions of the interior chamber 208 (e.g., those areas corresponding with the tire patch area) and lateral deflections within interior chamber 208 (e.g., due to external forces altering interior chamber shape). As a result, transducer 212 may provide enough information to generate a lateral-profile estimation (i.e., a depth-map) of interior chamber 208 (e.g., the sidewalls) that can be implemented to understand tire characteristics such as, but not limited to, the inflation status 216. In certain instances the lateral-profile estimation can be implemented to find pockets or bubbles at selected portions of the interior chamber 208 (e.g., the sidewalls). This information can further support an understanding of interior chamber 208 temperatures at those selected portions. It should be appreciated that transducer 212 may constantly pulse radio waves 214 or it may incrementally pulse radio waves 214 according to a predetermined setting. It should be further appreciated that telematics unit 30 may control transducer 212 to be rotated, transducer 212 may also by physically rotated by some other means, or antenna pattern may be modified, such that the sensors may make longitudinal measurements to measure the longitudinal cross-section of interior chamber 208. It should be appreciated that other VSMs 42 (e.g., suspension-system sensors) may support a finding of the camber angle measurements.

Transducer 212 may also provide the lateral-profile estimation with enough accuracy to that would allow for an accurate, real-time understanding of how the road surface and tire patch area are interacting with each other. This estimation may further allow for understanding of the surface or friction coefficient of the tire patch area and thus be derived to allow for an understanding of current road surface conditions (e.g., wet, sandy, icy, slick, rough, etc.). As a result, for example, system 200 may implement the lateral-profile estimation to conclude the road-surface are covered with water. System 200 may further implement the lateral-profile estimation to assist in the generation of an aquaplanning warning. This warning may be made through display 38 or it may be made through audio system 36.

FIG. 4 shows an embodiment of system 300 that incorporates multiple transducers 312. Incorporating multiple transducers 312 allows for multiple characteristic measurements of the internal structure of tire 202. As a result, a clearer depth-map of interior chamber 208 may be generated.

Figure 5:
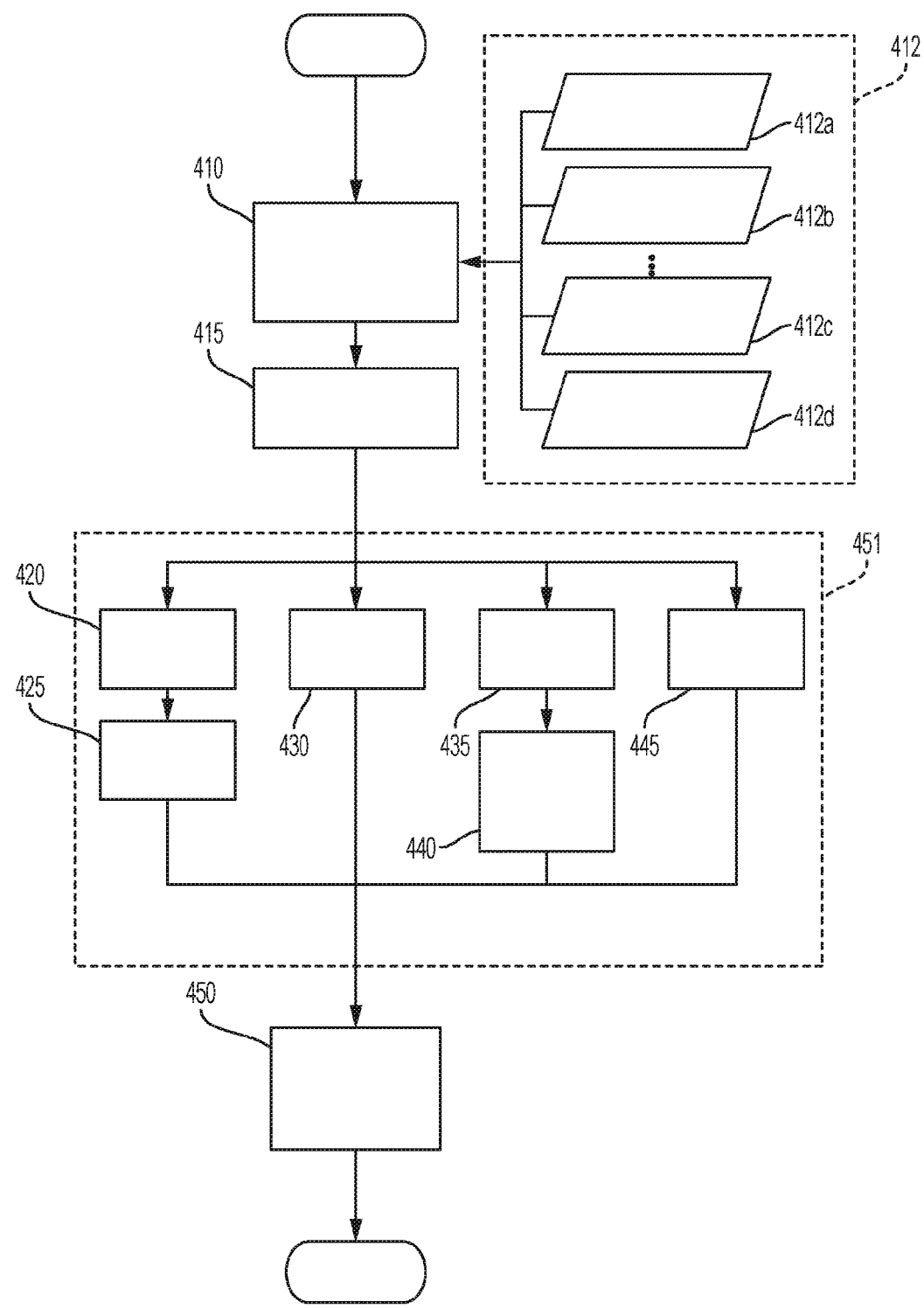
FIG. 5 is an exemplary flow chart of an exemplary algorithmic method of tire measurement.

FIG. 5 depicts exemplary flow chart of an algorithmic method 400 for calculating tire-chamber-perception information. One or more steps of method 400 may be completed through the implementation of controller 52 which may include one or more executable instructions incorporated into memory 54 and executed by of telematics unit 30. One or more aspects of method 300 may alternatively be transmitted by telematics unit 30 so as to be implemented by server 82 of data center 20, which may include one or more executable instructions incorporated into data base 81 (which may be transmitted via one or more satellites 62).

The algorithmic method 400 is supported by telematics unit 30 being preconfigured for connectivity (e.g., wirelessly via a short-range wireless communications component) with at least one transducer 412, discussed above. This configuration may be made by a vehicle manufacturer at or near the time of the telematics unit's assembly or after-market (e.g., via vehicle download using the afore-described tire chamber perception system 100 or at a time of vehicle service, just to name a couple of examples). In at least one implementation, one or more instructions are provided to the telematics unit 30 and stored on non-transitory computer-readable medium (e.g., on memory 54). Data from database 54 (e.g., the afore-described vehicle dynamics information) may also be transmitted to telematics unit 30 to facilitate implementation of method 400. Telematics unit 30 is also preconfigured to access the vehicle dynamics data (discussed above) located in memory 54 or database 81 or both.

Step 410 includes receiving measurement information from at least one transducer 412. As shown, for example, four transducers 412a, 412b, 412c, 412d may provide measurement information of the interior chamber of tire 402. As such, the measurement information of all transducer will be compiled and prepared for calculation purposes.

Step 415 includes calculating a lateral-profile estimation from the measurement information of the tire chamber. As discussed above, lateral-profile estimation may be generated from the cross-section, camber angle, and lateral deflection measurements of interior chamber 208. The lateral-profile estimation may determine the lateral forces being placed on tire 402 and therefore whether there are any locations within interior chamber 208 are being unduly flexed or weakened.

Step 420 includes calculating a tire-volume estimation from the lateral-profile estimations. It should be appreciated that a tire-pressure estimation may be made during step 420. Vehicle dynamics data from either telematics database 54 or data center databases 84 may be implemented to support a finding of the tire-volume estimation. The tire-volume estimation may provide fundamental information to determine whether tire 402 is under/over inflated. Step 425 includes calculating a tire-vibration estimation from the lateral-profile estimations. The tire-vibration information may be made through volume-displacement seen in the lateral-profile estimations. This information may help to understand vibrations on tire 402 from factors such as, but not limited to, tie-rod ends, ball joints, tire bulges and deformations, tire bounce, and other unbalanced tires (as seen through steering wheel/wheel vibrations). Vehicle dynamics data from either telematics database 54 or data center databases 84 may be implemented to support a finding of the tire-vibration estimation.

Step 430 includes calculating a tire-volume-derivative estimation from the lateral-profile estimations. This information may help to understand the rate of change in the tire-volume on tire 402. The vehicle dynamics experimental data stored in either telematics database 54 or data center databases 84 may be implemented to support an agile or pre-emptive vehicle stability control decisions that may otherwise lead to vehicle instability without the quick actuation response. Step 435 includes measuring a lateral-deflection estimation from the lateral-profile estimations. In this step, transducer 412 measures changes and displacements of selected portions of the interior chamber 408 (e.g., the tire sidewalls). Measuring this information may provide a more accurate understanding of the forces acting on the tire in the lateral direction, lateral slip, and tire inflation issues and may help provide an understanding of a tire blowout. These forces may be expressed as:

$$F = -k * \Delta x$$

Where F is the resorting force exerted by the spring, $\Delta x$ is the distance the string has been stretched, k is the spring elastic characteristics which may remain constant and in our use. $K_y$ may moreover express the lateral stiffness of the tire, such that the above equation may be expressed as:

$$F_y = -K_y * y_e$$

Where $F_y$ is the lateral force acting on the tire generating the lateral deflection and $y_e$ is the lateral reaction of the distance the tire has deflected laterally. By comparing to a table of maximum values based on experimentation, the stability control system may react or alert the vehicle operator accordingly.

Step 440 includes calculating a lateral-deflection-derivative estimation from the lateral-profile estimations. Extrapolating the first-time derivative of the lateral displacement $(\partial y_e)$, the lateral velocity $(V_y)$ of the tire-patch and second-time derivative for acceleration $(\partial y_e)$ may be achieved. Using the velocity $(V_y)$ and acceleration $(a_y)$ may assist the stability control system in the understanding of the impact level and expected rate of magnitude that the tire may experience. If the stability control system knows the velocity of the vehicle's center of mass $(V_x)$, this velocity may be calculated in a wheel longitudinal velocity $(V_{x\_w})$ using vehicle geometry. Using the wheel velocity and the lateral velocity $(V_y)$, the lateral side slip angle of that wheel may be expressed as:

$$\alpha_1 = \delta_f - \arctan(V_y / V_{x\_w})$$

Where, $\alpha_1$ is the lateral slip and $\delta_f$ is the steering angle. Vehicle dynamics data from either telematics database 54 or data center databases 84 may be implemented to support a finding of the lateral-deflection-derivative estimation.

Step 445 includes calculating a wheel-normal-reaction estimation from the lateral-profile estimations. Understanding the wheel-normal-reaction may aid in estimating the vertical load applied to the wheel form vehicle 12. Vehicle dynamics data from either telematics database 54 or data center databases 84 may be implemented to support a finding of the wheel-normal-reaction estimation.

Step 450 includes generating tire-chamber-perception information from the compilation of the tire chamber estimations (i.e., steps: 420-445). The generated tire-chamber-perception information may, for example, merely encompass each of the tire chamber estimations (i.e., steps: 420-445), as independent calculations, in a manner which may be transferable to other system components (e.g., display 38). As discussed above, this perception information may facilitate an understanding of information such as, but not limited, the tire profile shape at rest (including tire radius), tire profile shape during high velocity tire rotation (i.e., to understand tire-tread wear), enable agile inverse tire dynamic calculations, calculate tire patch area, calculate effective tire rolling radius, calculate tire rolling resistance, generate inverse terrain profiling information, estimate tire load ability, and generate an accurate linear tire velocity. It should be appreciated that additional vehicle sensors such as, but not limited to, wheel speed sensors and pressure sensors may assist in generating tire-chamber-perception information.

In certain embodiments of tire chamber perception system 100 and/or communications system 10, controller 52 and/or server 82 may incorporate multiple-core processors (e.g., telematics controller 54, data controller 81, etc.). As a result, method 400 may simultaneously compile the measurement information of the tire chamber. Method 400 may moreover calculate the tire-chamber-perception information in a parallel manner, as shown in block 451. Implementing parallel calculations 451 ensures no unwanted interdependencies between the steps of method 400, which depict the tire chamber estimations (i.e., steps: 420-445), unduly influence the results of the generated tire-chamber-perception information.

Once generated, the tire-chamber-perception information may be transmitted to data center 20, via telematics unit 30, to be recorded in databases 84. Recording this information may be allow vehicle owners to obtain critical tire properties, corresponding to their vehicle tires, via third-parties locations such as, but not limited to, computer 18 or a mobile computing device (not shown). The recorded information may also be used for mapping purposes to assist and update navigation-related services that are provided in conjunction with the GPS-based vehicle navigation module 40.

Visual display 38 may also be configured to exhibit the tire-chamber-perception information. This would allow the vehicle operator an ability to view up-to-date, real-time changes in their vehicle tires 102. In certain instances, the GUI interface of display 38 may moreover be configured to graphically exhibit the tire-chamber-perception information, so as to give the operator a more complete understanding of the changes in their vehicle tires 102. Telematics unit 30 may also receive the tire-chamber-perception information and send it to enhance one or more other vehicle systems such as, but not limited to, the agile safety/stability vehicle control system (not shown).

Method

Figure 6:
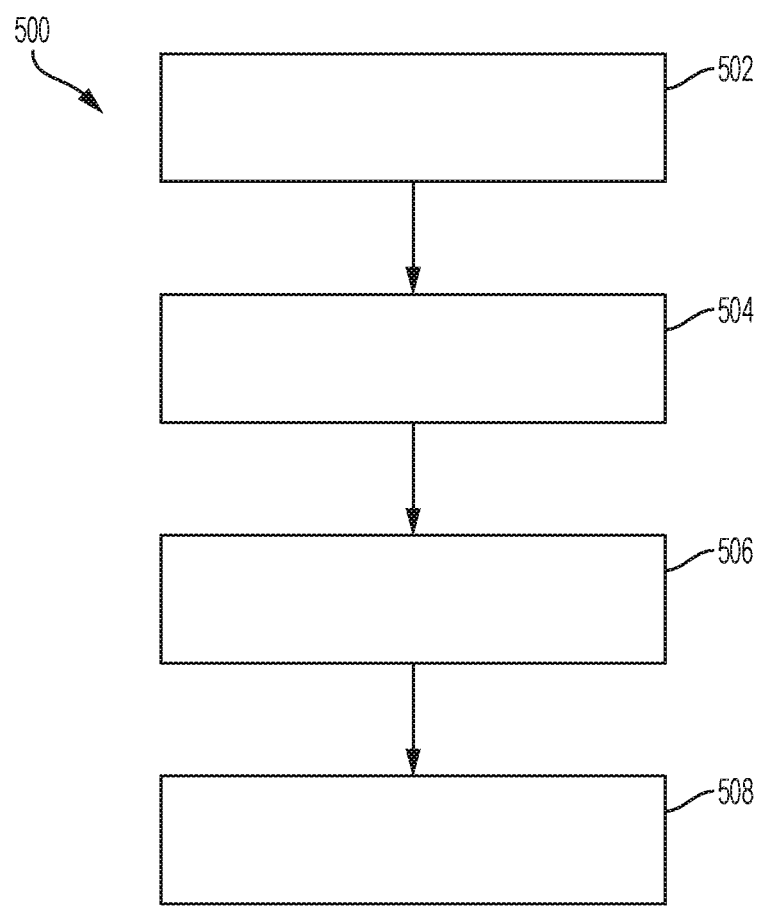
FIG. 6 is a flowchart of a method to perceive the structure of a tire chamber.

One example of the method involving perceiving the structure of an interior chamber of a tire 102 is shown in FIG. 6. It is to be understood that various components of the systems 10 and 100 of FIG. 1 and FIGS. 3-4, respectively, as well as algorithmic method 400 of FIG. 5 may be referenced throughout the discussion of FIG. 6, but may not be shown in FIG. 6. Step 502 involves the controller operating transducer 312. In this example, it should be understood that the controller may be telematics controller 52 or data center controller 81 or both. Step 504 involves implementing transducer 312 to measure a selected portion of the interior chamber of tire 502. The selected portion of the interior chamber may include the interior chamber sidewalls or those areas corresponding with the tire patch area. Step 506 involves the controller receiving the sensor measurements regarding the tire-chamber information. Step 508 involves the controller implementing algorithmic method 400 to calculate the tire-chamber-perception information, based on the measurement information of the tire chamber.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system to perceive a structure of a tire chamber, the system comprising:
   a memory comprising one or more executable instructions;
   a controller configured to read and execute the one or more executable instructions;
   a wheel adapted to connect to a vehicle axle;
   a vehicle tire connected to the wheel;
   a sensor fastened to the wheel and located within an interior chamber of the vehicle tire, the sensor configured to make one or more measurements of a selected portion of the tire chamber, the sensor configured to communicate the one or more measurements to the controller; and
   wherein the executable instructions enable the controller to:
      operate the sensor to make one or more measurements of the selected portion of the tire chamber;
      retrieve, from the sensor, measurement information of the tire chamber;
      generate tire-chamber-perception information from the measurement information of the tire chamber;
      calculate one or more lateral-profile estimations from the measurement information of the tire chamber;
      generate tire-chamber-perception information from the lateral-profile estimations;
      calculate one or more tire-volume estimations and/or calculate one or more tire-vibration estimations and/or calculate one or more wheel-normal-reaction estimations and/or measure one or more lateral-deflection estimations, from the lateral-profile estimations;

calculate one or more tire-volume-derivative estimations and/or calculate one or more lateral-deflection-derivative estimations, from the lateral-profile estimations; and generate the tire-chamber-perception information, from one or more of these tire chamber estimations.

2. The system of claim 1, further comprising:
a display configured to exhibit information;
wherein the executable instructions further enable the controller to:
exhibit, via the display, the tire-chamber-perception information.

3. The system of claim 2, further comprising:
wherein the executable instructions further enable the controller to:
generate an aqua-planning warning from the measurement information of the tire chamber; and
exhibit, through the display, the aqua-planning warning.

4. The system of claim 1, wherein the sensor is an Ultra Short-Range Radar (USRR).

5. The system of claim 1, wherein the sensor is in a wireless communication with the controller.

6. The system of claim 1, wherein the sensor is configured to cover longitudinal measurements of the tire chamber.

7. The system of claim 1, wherein the controller comprises a plurality of cores configured to: simultaneously compile the tire chamber estimations; and
generate, in a parallel manner, the tire-chamber-perception information from the tire chamber estimations.

8. A system to perceive a structure of a tire chamber, the system comprising:
a memory comprising one or more executable instructions;
a controller configured to read and execute the one or more executable instructions;
a wheel adapted to connect to a vehicle axle;
a vehicle tire connected to the wheel;
a display configured to exhibit tire-chamber-perception information, wherein the tire-chamber-perception information facilitates an understanding of a tire profile shape at rest and/or a tire profile shape during high velocity tire rotation and/or agile inverse tire dynamic calculations and/or a tire patch area and/or an effective tire rolling radius and/or a tire rolling resistance and/or inverse terrain profiling information and/or a tire load ability and/or a linear tire velocity;
a plurality of sensors fastened to the wheel and located within an interior chamber of the vehicle tire, the plurality of sensors configured to make one or more measurements of one or more selected portions of the tire chamber, the plurality of sensors configured to wirelessly communicate the one or more measurements to the controller;
wherein the executable instructions enable the controller to:
operate the plurality of sensors to make one or more measurements of the one or more selected portions of the tire chamber;
retrieve, from the plurality of sensors, measurement information of the tire chamber;
generate tire-chamber-perception information from the measurement information of the tire chamber;
exhibit, via the display, the tire-chamber-perception information;
calculate one or more lateral-profile estimations from the measurement information of the tire chamber;

generate tire-chamber-perception information from the lateral-profile estimations;
calculate one or more tire-volume estimations and/or calculate one or more tire-vibration estimations and/or calculate one or more wheel-normal-reaction estimations and/or measure one or more lateral-deflection estimations, from the lateral-profile estimations;
calculate one or more tire-volume-derivative estimations and/or calculate one or more lateral-deflection-derivative estimations, from the lateral-profile estimations; and
generate the tire-chamber-perception information, from one or more of these tire chamber estimations; and
wherein the controller comprises a plurality of cores configured to:
simultaneously compile the tire chamber estimations; and
generate, in a parallel manner, the tire-chamber-perception information from the tire chamber estimations.

9. The system of claim 8, further comprising:
wherein the executable instructions further enable the controller to:
generate an aqua-planning warning from the measurement information of the tire chamber; and
exhibit, through the display, the aqua-planning warning.

10. The system of claim 8, wherein the sensor is an Ultra Short-Range Radar (USRR).

11. The system of claim 8, wherein the sensor is configured to cover longitudinal measurements of the tire chamber.

12. A method to perceive a structure of a tire chamber, the method comprising:
providing a memory comprising one or more executable instructions;
providing a controller configured to read and execute the one or more executable instructions;
providing a wheel adapted to connect to a vehicle axle;
providing a vehicle tire connected to the wheel;
providing a sensor fastened to the wheel and located within an interior chamber of the vehicle tire;
configuring the sensor to make one or more measurements of a selected portion of the tire chamber;
configuring the sensor to communicate the one or more measurements to the controller;
wherein the executable instructions enable the controller to:
operating, via the controller, the sensor;
measuring, via the sensor, the selected portion of the tire chamber;
retrieving from the sensor, via the controller, measurement information of the tire chamber;
generating, via the controller, tire-chamber-perception information from the measurement information of the tire chamber;
configuring the controller to calculate one or more lateral-profile estimations from the measurement information of the tire chamber;
calculating, via the controller, one or more tire-volume estimations, from the lateral-profile estimations;
calculating, via the controller, one or more tire-vibration estimations, from the lateral-profile estimations;
calculating, via the controller, one or more wheel-normal-reaction estimations, from the lateral-profile estimations;
measuring, via the controller, one or more lateral-deflection estimations, from the lateral-profile estimations;

calculating, via the controller, one or more tire-volume-derivative estimations, from the lateral-profile estimations;

calculating, via the controller, one or more lateral-deflection-derivative estimations, from the lateral-profile estimations; and generating from one or more of these tire chamber estimations, via the controller, the tire-chamber-perception information.

13. The method of claim 12, further comprising:

providing a display configured to exhibit information; and exhibiting, via the display, the tire-chamber-perception information.

\* \* \* \* \*